United States Patent
Ichikawa et al.

(10) Patent No.: US 7,847,518 B2
(45) Date of Patent: Dec. 7, 2010

(54) POWER SYSTEM AND METHOD FOR MANAGING CHARGING STATE IN THAT POWER SYSTEM

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 187 days.

(21) Appl. No.: 12/308,987

(22) PCT Filed: Jul. 4, 2007

(86) PCT No.: PCT/JP2007/063774
§ 371 (c)(1),
(2), (4) Date: Dec. 31, 2008

(87) PCT Pub. No.: WO2008/015886
PCT Pub. Date: Feb. 7, 2008

(65) Prior Publication Data
US 2009/0315512 A1    Dec. 24, 2009

(30) Foreign Application Priority Data
Aug. 4, 2006    (JP) .............................. 2006-213260

(51) Int. Cl.
*H02J 7/00*    (2006.01)
(52) U.S. Cl. .................................. 320/109
(58) Field of Classification Search ............. 320/109
See application file for complete search history.

(56) References Cited

U.S. PATENT DOCUMENTS 7,256,516 B2 *  8/2007  Buchanan et al. ............. 307/62
7,582,979 B2 *  9/2009  Oyobe et al. ................. 290/1 R
2008/0077286 A1  3/2008  Oyobe et al.

FOREIGN PATENT DOCUMENTS

| JP | A-9-103002 | 4/1997 |
|---|---|---|
| JP | A-10-150733 | 6/1998 |
| JP | A-2000-209707 | 7/2000 |

(Continued)

OTHER PUBLICATIONS

Mar. 9, 2010 Office Action issued in Japanese Patent Application No. 2006-213260 (with translation).

*Primary Examiner*—Edward Tso
*Assistant Examiner*—Ramy Ramadan
(74) *Attorney, Agent, or Firm*—Oliff & Berridge, PLC

(57) ABSTRACT

Generation power determining unit specifies efficiency characteristic based on identification ID of each vehicle. Generation power determining unit determines a power generation mechanism or mechanisms to be operated such that amount of power consumption by the power generation mechanism or mechanisms as a whole is minimized. By dividing power $\Sigma Pg^*$ necessary for charging an electric storage unit that is in a low-charge state by the number of mechanisms to be operated (for example, 2 or 3), fuel consumption efficiency corresponding to generation power to be shared by each power generation mechanism in each case is obtained. There is a relation of $\eta(\frac{1}{2}) > \eta(\frac{1}{3})$ and, therefore, it can be understood that two power generation mechanisms are to be operated to minimize total amount of fuel consumption. Generation power determining unit transmits a power generation instruction to vehicles that correspond to the determined two power generation mechanisms.

14 Claims, 12 Drawing Sheets

FOREIGN PATENT DOCUMENTS

| | | |
|---|---|---|
| JP | A-2001-008380 | 1/2001 |
| JP | A-2001-526455 | 12/2001 |
| JP | A-2002-112460 | 4/2002 |
| JP | A-2002-135906 | 5/2002 |
| JP | A-2002-315193 | 10/2002 |
| JP | A-2005-168085 | 6/2005 |
| JP | A-2006-204081 | 8/2006 |
| WO | WO 99/30412 A1 | 6/1999 |
| WO | WO 2006/059763 A1 | 6/2006 |

* cited by examiner

POWER SYSTEM AND METHOD FOR MANAGING CHARGING STATE IN THAT POWER SYSTEM

TECHNICAL FIELD

The present invention relates to a power system including a plurality of vehicles adapted to allow transfer of electric power to/from the outside of the vehicle and, more specifically, the present invention relates to a technique for managing state of charge of an electric storage unit mounted on each vehicle.

BACKGROUND ART

Recently, in consideration of environmental issues, vehicles using electric motors as driving power sources such as electric vehicles, hybrid vehicles and fuel cell electric vehicles have been attracting attention. Such a vehicle is provided with a rechargeable electric storage unit for supplying electric power to an electric motor and for converting kinetic energy to electric energy at the time of regenerative braking and for storing the same.

Use of an electric vehicle with such an electric storage unit as an electric power source of a house or the like has been proposed. By way of example, Japanese Patent Laying-Open No. 2001-008380 discloses a power management system that allows transmission of electric power between a house and a battery mounted on an electric vehicle.

Electric vehicles such as represented by hybrid vehicles are rapidly becoming common due in part to lower costs enabled by technical innovation. Along with the widespread use of electric vehicles, it is fully expected that a large number of households own a plurality of electric vehicles.

Japanese Patent Laying-Open No. 2000-209707 discloses a charging plan equipment for electric vehicles for leveling electric power usage and for realizing low running cost, when a plurality of electric vehicles are charged. The charging plan equipment forms a charging plan that makes power load for charging an object closer to desired power load conditions.

Among the electric vehicles mentioned above, hybrid vehicles that are most widely commercialized are capable of generating electric power, by receiving driving force from an internal combustion engine, such as an engine. Therefore, when a plurality of hybrid vehicles are electrically connected to each other, it is possible for each hybrid vehicle to receive electric power generated by any of the hybrid vehicles including itself and to charge the electric storage unit of itself.

Generally, fuel consumption efficiency of an internal combustion engine is known to vary dependent on rotational speed, generated torque and the like. Therefore, even when the same amount of electric power is generated, amount of fuel consumed for generating the electric power may differ in accordance with characteristics of each internal combustion engine.

The charge plan equipment disclosed in Japanese Patent Laying-Open No. 2000-209707 referred to above is devised for electric vehicles not including any internal combustion engine, and fuel consumption efficiency of the internal combustion engine has not been considered.

DISCLOSURE OF THE INVENTION

The present invention was made to solve such a problem, and its object is to provide a power system involving a plurality of vehicles each adapted to allow transfer of electric power to/from the outside of the vehicle, allowing efficient management of charging state of the electric storage unit of each vehicle, and to provide a method therefor.

According to an aspect, the present invention provides a power system, including a plurality of vehicles each adapted to allow transfer of power to/from the outside of the vehicle, and power management means for managing power exchange among the plurality of vehicles. The plurality of vehicles are electrically connected to each other, and the power management means is adapted to allow transmission/reception of information to/from each of the plurality of vehicles. Each of the plurality of vehicles includes a rechargeable electric storage unit, a power generation mechanism capable of generating power by receiving driving force from an engine operated by fuel combustion, state of charge obtaining means for obtaining state of charge of the electric storage unit, state of charge transmitting means for transmitting the obtained state of charge to the power management means, and power generation control means for controlling power generation by the power generation mechanism, in response to a power generation instruction from the power management means. The power management means includes necessary power calculating means for calculating, if there is any electric storage unit that is in a low-charge state, based on the state of charge transmitted from each of the plurality of vehicles, power necessary for charging the electric storage unit that is in the low-charge state, generation power determining means for determining at least one power generation mechanism to be operated for generating the power calculated by the necessary power calculating means, such that amount of fuel consumption by the power generation mechanism as a whole is minimized, and power generation instruction transmitting means for applying the power generation instruction to the vehicle that corresponds to each of the determined power generation mechanisms.

According to the present invention, based on the state of charge transmitted from each of the plurality of vehicles, the power management means calculates electric power necessary for charging electric storage unit that is in a low-charged state. Then, the electric power generation mechanism to be operated for generating the calculated electric power is determined such that the amount of fuel consumed by the electric power generation mechanism or mechanisms as a whole is minimized. Consequently, it becomes possible to optimally select the electric power generation mechanism to be operated in the whole power system in accordance with the state of electric storage unit. Therefore, efficient use of fuel used for power generation and management of state of charge of the electric storage unit can both be realized.

Preferably, the generation power determining means determines the number of power generation mechanisms to be operated, based on efficiency characteristic obtained in advance, representing correspondence between generation power of each of the power generation mechanisms and fuel consumption efficiency of the engine, such that fuel consumption efficiency of power generation mechanism or mechanisms to be operated as a whole is maximized.

More preferably, the generation power determining means determines generation power to be shared by each of the power generation mechanisms to be operated, based on efficiency characteristic obtained in advance, representing correspondence between generation power of each of the power generation mechanisms and fuel consumption efficiency of the engine, such that fuel consumption efficiency of power generation mechanism or mechanisms to be operated as a whole is maximized.

More preferably, each of the plurality of vehicles further includes identification information transmitting means for transmitting identification information representing itself to the power management means, the identification information transmitting means further includes efficiency characteristic storing means for storing in advance the efficiency characteristic in correspondence with each piece of identification information, and the generation power determining means specifies the efficiency characteristic of each of the plurality of vehicles among the plurality of stored efficiency characteristics, based on the identification information transmitted from each of the plurality of vehicles.

More preferably, the power line is electrically connected, in order to allow power exchange between the plurality of vehicles and a common power load, to the power load, and the power management means further includes load power obtaining means for obtaining load power to be supplied to the power load. Said necessary power calculating means calculates the necessary power by reflecting the load power obtained by the load power obtaining means.

More preferably, the power management means and each of the plurality of vehicles are adapted to transmit/receive information through the power line.

More preferably, at least one of the plurality of vehicles includes first and second rotating electrical machines each formed to include a star-connected stator, and first and second inverters electrically connected to the electric storage unit for driving the first and second rotating electrical machines, respectively, and adapted to perform power exchange to/from the outside of the vehicle, through a first neutral point of the first rotating electrical machine and a second neutral point of the second rotating electrical machine. Further, each of the first and second inverters is capable of executing a switching operation such that a single-phase AC voltage is generated between the first neutral point and the second neutral point.

According to another aspect, the present invention provides a power system, including a plurality of vehicles each adapted to allow transfer of power to/from the outside of the vehicle, a power line for electrically connecting the plurality of vehicles to each other, and a power management device for managing power exchange among the plurality of vehicles. The power management device is adapted to allow transmission/reception of information to/from each of the plurality of vehicles. Each of the plurality of vehicles includes a rechargeable electric storage unit, a power generation mechanism capable of generating power by receiving driving force from an engine operated by fuel combustion, a state of charge obtaining unit for obtaining state of charge of the electric storage unit, a state of charge transmitting unit for transmitting the obtained state of charge to the power management device, and a power generation control unit for controlling power generation by the power generation mechanism, in response to a power generation instruction from the power management device. The power management device is operative to calculate, if there is any electric storage unit that is in a low-charge state, based on the state of charge transmitted from each of the plurality of vehicles, power necessary for charging the electric storage unit that is in the low-charge states to determine at least one power generation mechanism to be operated for generating the calculated necessary power, such that amount of fuel consumption by the power generation mechanism as a whole is minimized, and to apply the power generation instruction to the vehicle that corresponds to each of the determined power generation mechanisms.

According to a still further aspect, the present invention provides, for a plurality of vehicles each including a rechargeable electric storage unit, a method of managing state of charge of the electric storage unit. Each of the plurality of vehicles is adapted to allow transfer of power to/from the outside of the vehicle, electrically connected to each other through a power line, and adapted to allow transmission/reception of information to/from a power management unit, and includes a power generation mechanism capable of generating power, receiving driving force from an engine operated by fuel combustion. The method includes the steps of: for each of the plurality of vehicles, obtaining the state of charge of the corresponding electric storage unit; transmitting the obtained state of charge from each of the plurality of vehicles to the power management unit; calculating, if there is any electric storage unit that is in a low charge state, based on the state of charge transmitted from each of the plurality of vehicles to the power management unit, power necessary for charging the electric storage unit that is in the low charge state; determining, by the power management unit, at least one power generation mechanism to be operated for generating the necessary power, such that total amount of fuel consumption is minimized; applying a power generation instruction from the power management unit, to the vehicle corresponding to each of the determined power generation mechanisms; and controlling power generation by the corresponding power generation mechanism, in response to the power generation instruction, in the vehicle receiving the power generation instruction.

According to the present invention, based on the state of charge transmitted from each of the plurality of vehicles, the power management unit calculates electric power necessary for charging electric storage unit that is in a low-charge state. Then, the electric power generation mechanism to be operated for generating the calculated electric power is determined such that the amount of fuel consumed by the electric power generation mechanism or mechanisms as a whole is minimized. Consequently, it becomes possible to optimally select the electric power generation mechanism to be operated in the whole power system in accordance with the state of electric storage unit. Therefore, efficient use of fuel used for power generation and management of state of charge of the electric storage unit can both be realized.

Preferably, in the step of determining power generation mechanism, the number of power generation mechanisms to be operated is determined, based on efficiency characteristic obtained in advance, representing correspondence between generation power of each of the power generation mechanisms and fuel consumption efficiency of the engine, such that fuel consumption efficiency of power generation mechanism or mechanisms to be operated as a whole is maximized.

Preferably, in the step of determining power generation mechanism, generation power to be shared by each of the power generation mechanisms to be operated is determined, based on efficiency characteristic obtained in advance, representing correspondence between generation power of each of the power generation mechanisms and fuel consumption efficiency of the engine, such that fuel consumption efficiency of power generation mechanism or mechanisms to be operated as a whole is maximized.

More preferably, the method further includes the steps of each of the plurality of vehicles transmitting identification information representing itself to the power management unit; and based on the identification information transmitted from each of the plurality of vehicles, the power management unit specifying the efficiency characteristic of each of the plurality of vehicles, making reference to the plurality of efficiency characteristics stored in advance in correspondence with the identification information.

The present invention involves a plurality of vehicles each adapted to allow exchange of electric power to/from the outside of the vehicle, and the state of charge of the electric storage unit in each vehicle can efficiently be managed.

BEST MODES FOR CARRYING OUT THE INVENTION

Figure 1:
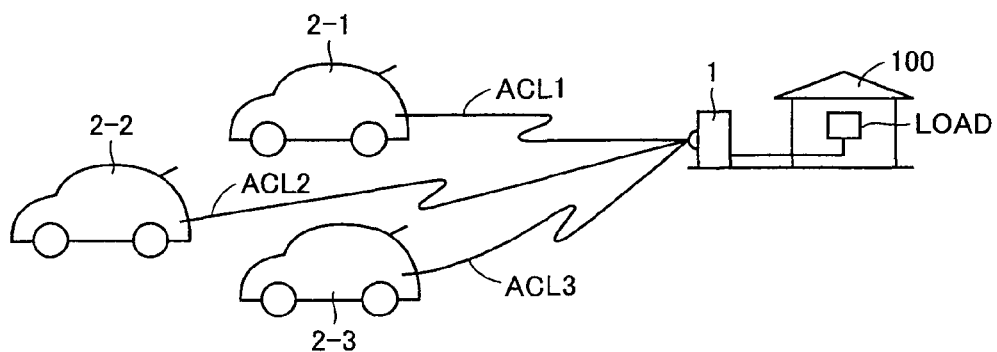
FIG. 1 shows a schematic configuration of a power system in accordance with an embodiment of the present invention.

Embodiments of the present invention will be described in detail with reference to the figures. In the figures, the same or corresponding portions are denoted by the same reference characters and description thereof will not be repeated.

Referring to FIG. 1, the power system in accordance with an embodiment of the present invention involves hybrid vehicles 2-1, 2-2, 2-3 (hereinafter simply referred to as a "vehicle"), each adapted to allow transfer of electric power to/from the outside of the vehicle. Though an example in which three vehicles 2-1, 2-2 and 2-3 supply AC power to a house will be described here, the present invention is applicable to any number of vehicles.

Vehicles 2-1, 2-2 and 2-3 are electrically connected to each other through supply lines ACL1, ACL2 and ACL3, respectively. Further, vehicles 2-1, 2-2 and 2-3 are also electrically connected to a common power load LOAD of a house 100, and are capable of supplying electric power to power load LOAD. In the following description, when any of the vehicles 2-1, 2-2 and 2-3 is referred to without specific distinction, it will be generally referred to as a "vehicle" and if any of supply lines ACL1, ACL2 and ACL3 is referred to without specific distinction, it will be generally referred to as a "supply line ACL."

As will be described later, each of the vehicles 2-1, 2-2 and 2-3 is formed to include a rechargeable electric storage unit, and an electric power generation mechanism that can generate electric power by receiving of driving force from the engine that runs on fuel combustion.

Further, the power system in accordance with the embodiment of the present invention includes a power management device 1 arranged between supply lines ACL1, ACL2, ACL3 and the house 100. Power management device 1 manages transfer of electric power between each of vehicles 2-1, 2-2 and 2-3, and power supply from vehicles 2-1, 2-2 and 2-3 to power load LOAD. Further, power management device 1 manages state of charge of the electric storage unit in each of vehicles 2-1, 2-2 and 2-3.

Specifically, power management unit 1 is configured to be capable of transmitting/receiving information to/from each of the vehicles 2-1, 2-2 and 2-3. Power management device 1 calculates, based on the state of charge (hereinafter also referred to as "SOC") of the electric storage units transmitted from vehicles 2-1, 2-2 and 2-3, the electric power necessary for executing charging of the electric storage unit that is in a low-charge state. Further, power management unit 1 determines the electric power generation mechanism to be operated for generating the calculated electric power and transmits a power generation instruction to the vehicle that corresponds to each of the determined electric power generation mechanisms. Then each of the vehicles that received the power generation instruction starts operation of the engine, so as to start generation of prescribed amount of electric power, in accordance with the power generation instruction.

The low-charge state typically refers to a state in which SOC of the electric storage unit is below a prescribed threshold value.

In this manner, power management device 1 monitors the state of electric storage unit of each of the vehicles 2-1, 2-2 and 2-3, and if it is necessary to generate power by the electric power generation mechanism, it selects and operates an optimal electric power generation mechanism so that maximum fuel consumption efficiency regarding power generation is attained in the power system as a whole.

Power management device 1 and each of the vehicles 2-1, 2-2 and 2-3 implement transmission/reception of information through power line communication (PLC: hereinafter also referred to as "PLC communication") through supply lines ACL1, ACL2 and ACL3, respectively.

(Configuration of Power Management Device)

Figure 2:
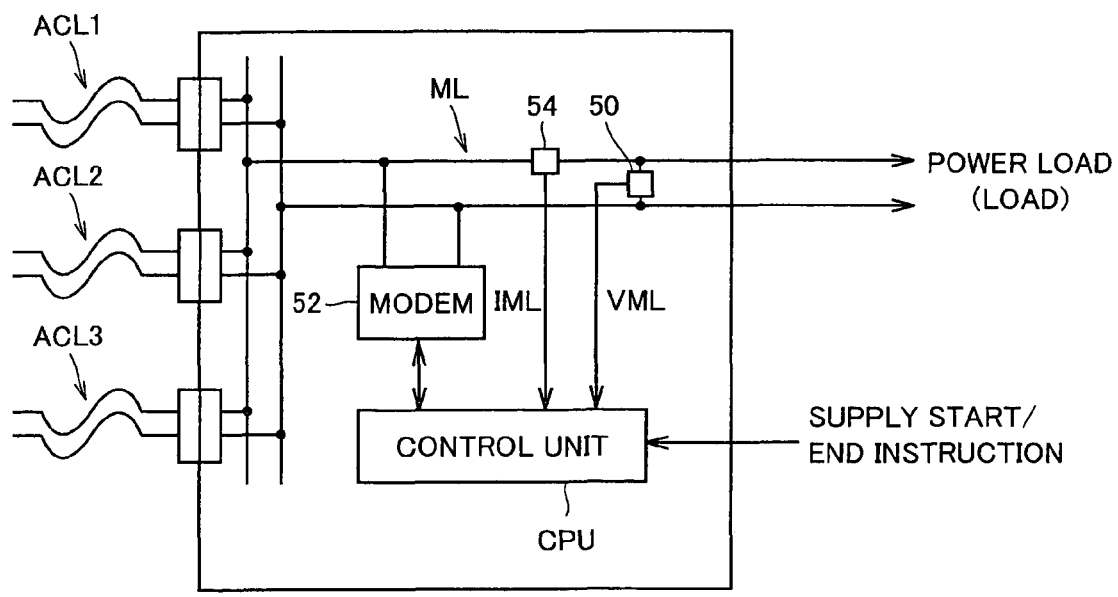
FIG. 2 shows a schematic configuration of a power management device 1 in accordance with the embodiment of the present invention.

Referring to FIG. 2, power management device 1 is configured allowing attachment/detachment of supply lines ACL1, ACL2 and ACL3 of vehicles 2-1, 2-2 and 2-3, respectively. By way of example, a male connector is attached to one end of supply lines ACL1, ACL2 and ACL3, while a female connector that fits the male connector is provided on a side surface of power management device 1. Power management device 1 couples supply lines ACL1, ACL2 and ACL3 to a common main line ML, and electrically connects to power load LOAD.

Further, power management device 1 includes a modem 52, a main line voltage detecting unit 50, a main line current detecting unit 54, and a control unit CPU.

Modem 52 transmits/receives information to/from each of the plurality of vehicles electrically connected to each other. Specifically, modem 52 is connected between main lines ML, modulates an information signal (transmission) applied from the control unit CPU and superposes it on a main line current flowing through the main line ML, and extracts a modulated signal included in the main line current flowing through the main line ML, demodulates the same to an information signal (reception) and outputs it to the control unit CPU. The electric power supplied from vehicles 2-1, 2-2 and 2-3 to power load LOAD has, by way of example, commercial frequency (e.g. 50 Hz or 60 Hz). Therefore, by using a modulation signal having a specific frequency band within the range of several tens of kHz to several tens of MHz, it is possible to separate in terms of frequency the supplied electric power from the modulation signal. Thus, exchange of power and transmission/reception of information through the supply line ACL are both possible.

Main line voltage detecting unit 50 is connected between main lines ML, detects a voltage supplied to power load LOAD, that is, the main line voltage VML appearing on the main line ML, and outputs the detected value to the control unit CPU. Main line current detecting unit 54 is inserted to one of the main lines ML, detects a current supplied to power load LOAD, that is, main line current IML flowing through the main line ML, and outputs the detected value to the control unit CPU.

Control unit CPU is capable of receiving a supply start/end instruction from a user or the like. Control unit CPU manages the electric power supplied from each of the plurality of vehicles to power load LOAD, and manages the state of charge of the electric storage unit of each vehicle.

Specifically, receiving a supply start instruction, control unit CPU transmits an identification ID inquiry instruction to each vehicle, via modem 52. Control unit CPU receives the identification ID returned by each of the vehicles, via modem 52. Control unit CPU obtains characteristics of each vehicle based on the identification ID returned from each of the vehicles, and then, issues an output start instruction to each vehicle. Then, each vehicle starts transfer of electric power.

After the start of electric power exchange by each vehicle, control unit CPU receives a state value transmitted from each of the vehicles. The state value at least includes SOC of the corresponding electric storage unit. Then, based on the SOC of each vehicle, control unit CPU determines charge/discharge power of the corresponding storage unit. Further, control unit CPU obtains the load power supplied to power load LOAD, from the main line current IML and main line voltage VML. Further, control unit CPU calculates electric power necessary for executing charging of the electric storage unit that is in a low-charge state, based on the sum of charge/discharge power of electric storage units and the load power. If the electric power runs short, control unit CPU determines an electric power generation mechanism or mechanisms to be operated such that the amount of fuel consumed by the power generation mechanism as a whole is minimized, and transmits a power generation instruction to each of the vehicles that correspond to the determined power generation mechanism or mechanisms. Then, control unit CPU executes the above-described process repeatedly until it receives a supply end instruction.

As will be described later, control unit CPU determines the number of electric power generation mechanisms to be operated, so that maximum fuel consumption efficiency can be attained in the overall electric power generation mechanisms in operation, based on predetermined efficiency characteristic that represents correspondence between generated power of each of the electric power generation mechanisms of the vehicles and the fuel consumption efficiency of the engine. Alternatively, control unit CPU determines the generation power to be shared by each of the electric power generation mechanisms to be operated, so that maximum fuel consumption efficiency can be attained in the overall electric power generation mechanisms in operation, based on the efficiency characteristic.

(Vehicle Configuration)

Figure 3:
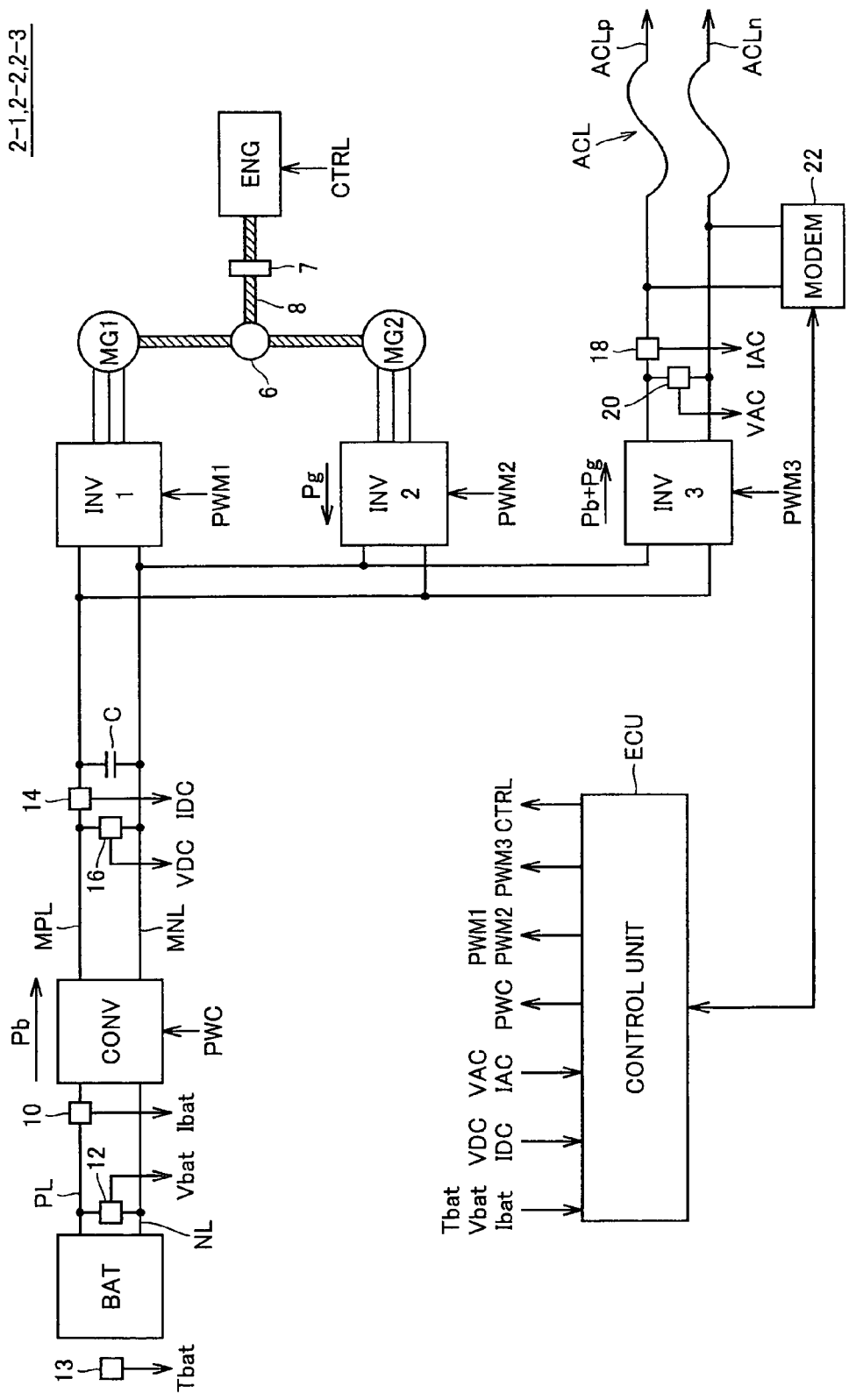
FIG. 3 shows a schematic configuration of each of the vehicles in accordance with the embodiment of the present invention.

FIG. 3 shows a schematic configuration of each of vehicles 2-1, 2-2 and 2-3, in accordance with the embodiment of the present invention. The present invention is applicable to any vehicle that includes a rechargeable electric storage unit and an electric power generation mechanism capable of generating electric power, by receiving driving force from an engine. As an example, an implementation by a hybrid vehicle will be described.

Referring to FIG. 3, each of the vehicles 2-1, 2-2 and 2-3 includes a control unit ECU, an electric storage unit BAT1, a converter CONV1, inverters INV1, INV2, INV3, motor generators MG1 and MG2, an engine ENG, and a modem 22.

Electric storage unit BAT is configured to allow charging/discharging by the converter CONV. By way of example, a lithium ion or a nickel hydride secondary battery, or an electric storage such as an electric double layer capacitor may be used as electric storage unit BAT.

A battery temperature detecting unit 13 arranged close to electric storage unit BAT detects battery temperature Tbat of electric storage unit BAT, and outputs the detected value to control unit ECU. Battery temperature detecting unit 13 may be configured such that based on results of detection by a plurality of detecting elements arranged corresponding to a plurality of battery cells forming the electric storage unit BAT, a representative value is output by averaging process or the like.

Converter CONV is electrically connected to electric storage unit BAT through a positive power line PL and a negative power line NL, and connected to inverters INV1, INV2 and INV3 through main positive power line MPL and a main negative power line MNL. Converter CONV performs a voltage converting operation (voltage lowering operation or boosting operation) between electric storage unit BAT and main positive and negative lines MPL and MNL, and thereby controls charging/discharging of electric storage unit BAT. Specifically, when electric storage unit BAT is to be charged, converter CONV lowers the voltage between main positive and negative power lines MPL and MNL, and supplies charging current to electric storage unit BAT. When electric storage unit BAT is to be discharged, converter CONV boosts the discharging voltage of electric storage unit BAT, and supplies discharge current to inverters INV1, INV2 and INV3, through main positive and negative power lines MPL and MNL.

A battery current detecting unit 10 inserted to positive power line PL detects the charge/discharge current Ibat of electric storage unit BAT, and outputs the detected value to control unit ECU. Further, a battery voltage detecting unit 12 connected between positive power line PL and negative power line NL detects an output voltage Vbat of electric storage unit BAT, and outputs the detected value to control unit ECU.

Inverters INV1 and INV2 are connected in parallel to main positive power line MPL and main negative power line MNL, and transfer electric power to/from electric storage unit BAT through converter CONV. Specifically, inverters INV1 and INV2 are adapted to be capable of converting DC power applied through main positive power line MPL and main negative power line MNL to AC power and thereby driving motor generators MG1 and MG2, respectively. Further, at the time of regenerative braking of the vehicle, for example, inverters INV1 and INV2 are capable of converting the AC power generated by motor generators MG1 and MG2 and returning the power to electric storage unit BAT. By way of example, inverters INV1 and INV2 are formed of a bridge circuit including three-phase switching elements and, by performing a switching operation (opening/closing circuit) in response to switching commands PWM1 and PWM2 received from control unit ECU, generate three-phase AC power, respectively.

A supply current detecting unit 14 inserted to main positive power line MPL detects main line current IDC flowing between converter CONV and inverters INV1, INV2 and INV3, and outputs the detected value to control unit ECU. Further, a main line voltage detecting unit 16 connected between main positive power line MPL and main negative power line MNL detects a main line voltage VDC, and outputs the result of detection to control unit ECU. Further, between main positive power line MPL and main negative power line MNL, a smoothing capacitor C is connected, which reduces fluctuation component (AC component) involved in the electric power flowing between the converter CONV and inverters INV1, INV2 and INV3.

Motor generators MG1 and MG2 are capable of generating rotation driving force, by receiving AC power supplied from inverters INV1 and INV2, respectively, and capable of generating AC power, by receiving rotation driving force from engine ENG. By way of example, each of the motor generators MG1 and MG2 is a three-phase AC rotating electric machine including a rotor with embedded permanent magnet. Output shafts of motor generators MG1 and MG2 are mechanically coupled to engine ENG, via a power split device 6 and a driving shaft 8.

Engine ENG is an internal combustion engine that operates on combustion of fossil fuel such as gasoline. The driving force generated by the engine ENG may be transmitted to wheels (not shown) via a power transmitting unit 7 provided on driving shaft 8, together with the driving force from motor generators MG1 and MG2. Further, in response to a control signal CTRL from control unit ECU, engine ENG starts and stops operation and changes the state of combustion (rotational speed).

When the power system in accordance with the present embodiment is implemented, each vehicle is connected to power management device 1 through supply line ACL and, therefore, it does not run. Therefore, it is unnecessary to apply the driving force generated by engine ENG to wheels (not shown). Therefore, in the present embodiment, a prescribed switching command PWM2 is applied to inverter INV2, such that driving force of the engine ENG is entirely transmitted to motor generator MG2 to cause generation of electric power. Specifically, though motor generators MG1 and MG2 can be driven to rotate by the driving force output from engine ENG, only the switching operation of inverter INV2 corresponding to motor generator MG2 is rendered effective and, therefore, motor generator MG2 functions as a power generator.

Namely, in the present embodiment, engine ENG, motor generator MG2 and inverter INV2 correspond to the "power generation mechanism."

Inverter INV3 is connected in parallel with inverters INV1 and INV2 to main positive line MPL and main negative line MNL, receives a discharge power (DC power) from electric storage unit BAT supplied through converter CONV, and generates AC power to be supplied to power load LOAD (FIG. 2). By way of example, inverter INV3 is implemented by a single-phase inverter, to be adaptable to the electric power used in household 100. Inverter INV3 transfers electric power to/from the outside of the vehicle, through supply line ACL (positive supply line ACLp and negative supply line ACLn).

Supply current detecting unit 18 inserted to positive power line ACLp detects supply current IAC to power load LOAD, and outputs the detected value to control unit ECU. Further, supply voltage detecting unit 20 connected between positive power line ACLp and negative supply line ACLn detects supply voltage VAC to power load LOAD, and outputs the detected value to control unit ECU.

Modem 22 is configured to allow transmission/reception of information to/from other vehicles and power management device 1 (FIGS. 1 and 2). Specifically, modem 22 is connected to positive supply line ACLp and negative supply line ACLn, and implements transmission/reception of information by PLC communication through supply lines ACL.

Receiving an identification ID inquiry instruction from power management device 1 via modem 22, control unit ECU returns identification ID of itself. Examples of the identification ID include vehicle line information, model of engine ENG, and capacity of electric storage unit BAT. Thereafter, receiving an output start instruction from power management device 1 via modem 22, control unit ECU generates a switching command PWM3, and starts exchange of electric power to/from the outside of the vehicle.

Then, control unit ECU obtains SOC of electric storage unit BAT, and transmits it to power management device 1 via modem 22. Further, in response to a control instruction transmitted from power management device 1, control unit ECU controls charge/discharge power Pb of the electric storage unit. If a power generation instruction is included in the control instruction transmitted from power management device 1, control unit ECU operates engine ENG to generate electric power Pg in accordance with the power generation instruction. Then, control unit ECU executes the above-described process repeatedly until it receives a supply end instruction from power management device 1.

In the embodiment of the present invention, engine ENG, motor generator MG2 and inverter INV2 correspond to the "power generation mechanism." Further, control unit ECU implements the "state of charge obtaining means", "state of charge transmitting means", "power generation control means" and "identification information transmitting means." Further, power management device 1 implements the "power management means", and control unit CPU implements the "necessary power calculating means", "generation power determining means", "power generation instruction transmitting means" and "load power obtaining means."

In the following description, when charge/discharge electric power Pb and generation power Pg are used as values for specific vehicles, they will be used with suffixes, such as Pb1, Pb2, Pb3 and Pg1, Pg2 and Pg3.

(Power Management in Power System)

Figure 4A:
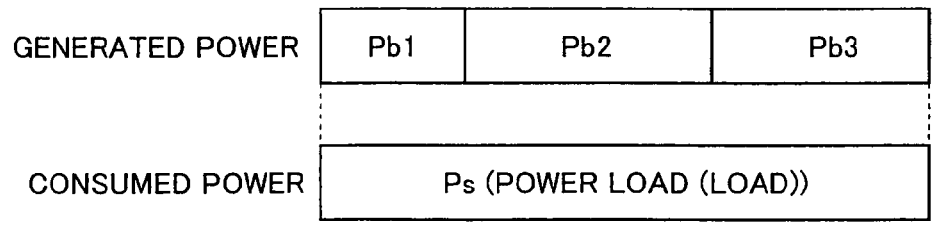
FIGS. 4A to 4C illustrate manner of electric power control in the power system in accordance with the embodiment of the present invention.
Figure 4B:
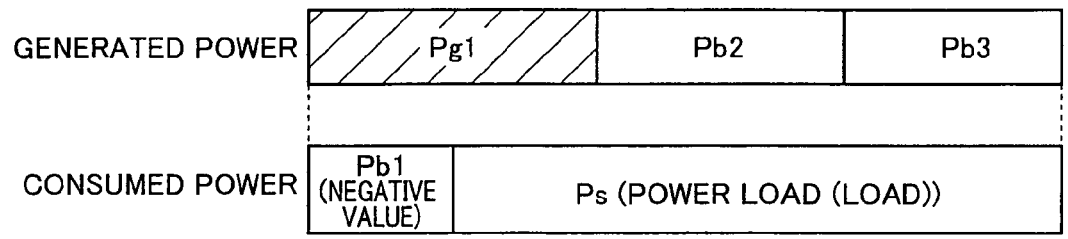
Figure 4C:
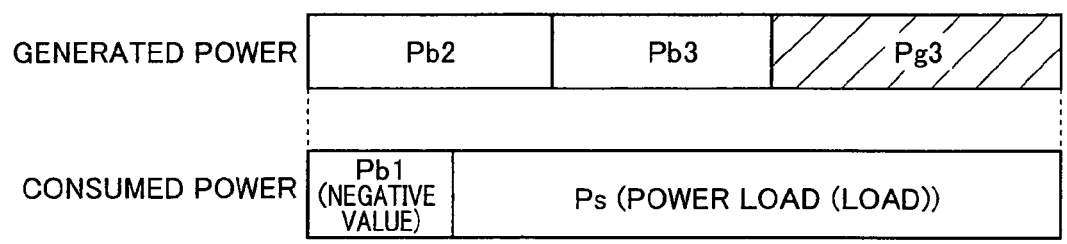

Referring to FIGS. 4A to 4C, power management in the power system in accordance with the embodiment of the present invention will be described.

FIG. 4A shows an example in which electric storage unit BAT of every vehicle has sufficiently high SOC. FIG. 4B shows an example in which SOC decreased in the electric storage unit BAT of vehicle 2-1. FIG. 4C shows another example in which SOC decreased in the electric storage unit BAT of vehicle 2-1.

Referring to FIG. 4A, when electric storage unit BAT of every vehicle has sufficiently high SOC, every electric storage unit BAT may be discharged and, therefore, power consumption in the power system derives only from the load power Ps of power load LOAD. The load power Ps is shared by vehicles 2-1, 2-2 and 2-3. The sum of charge/discharge powers Pb1, Pb2 and Pb3 (all positive values) shared by vehicles 2-1, 2-2 and 2-3 equals load power Ps. In the following description, charge/discharge powers Pb1, Pb2 and Pb3 will represent charge power or discharge power by a sign. Specifically, charge power corresponds to a positive value and discharge power corresponds to a negative value.

Referring to FIG. 4B, assume that as the electric power is supplied to power load LOAD, SOC of electric storage unit BAT of vehicle 2-1 lowers (attains to the low-charge state). In that case, it is impossible for electric storage unit BAT of vehicle 2-1 to continue discharging. Therefore, it becomes necessary to charge electric storage unit BAT of vehicle 2-1 by receiving electric power from any of the vehicles (including vehicle 2-1). Consequently, power consumption in the power system will be the load power Ps of power load LOAD plus the charge/discharge power Pb1 (negative value) for the electric storage unit BAT of vehicle 2-1.

On the other hand, power generation will be only the charge/discharge powers Pb2 and Pb3 (both positive values) shared by vehicles 2-2 and 2-3, as the charge/discharge power shared by vehicle 2-1 in the example of FIG. 4A is lost. Therefore, the electric power necessary for charging the electric storage unit BAT that is in the low-charge state corresponds to load power Ps–charge/discharge power Pb1 (negative power)–charge/discharge power Pb2 (positive value)–charge/discharge value b3 (positive power). In order to generate electric power corresponding to this power, which of the power generation mechanisms should be operated is determined, on condition that amount of fuel consumption in the power generation mechanisms as a whole is minimized. For example, in the example of FIG. 4B, it is determined that power generation mechanism of vehicle 2-1 should be operated. Then, generation power Pg1 generated by the power generation mechanism of vehicle 2-1 is used for charging electric storage unit BAT of vehicle 2-1 and for supplying electric power to power load LOAD.

As another example, referring to FIG. 4C, it is determined that power generation mechanism of vehicle 2-3 should be operated. Then, generation power Pg3 generated by the power generation mechanism of vehicle 2-3 is used for charging electric storage unit BAT of vehicle 2-1 and for supplying electric power to power load LOAD.

In this manner, in the power system, electric power to be generated is determined such that power consumption and power generation will be balanced.

(Sequence of Overall Power System)

Figure 5:
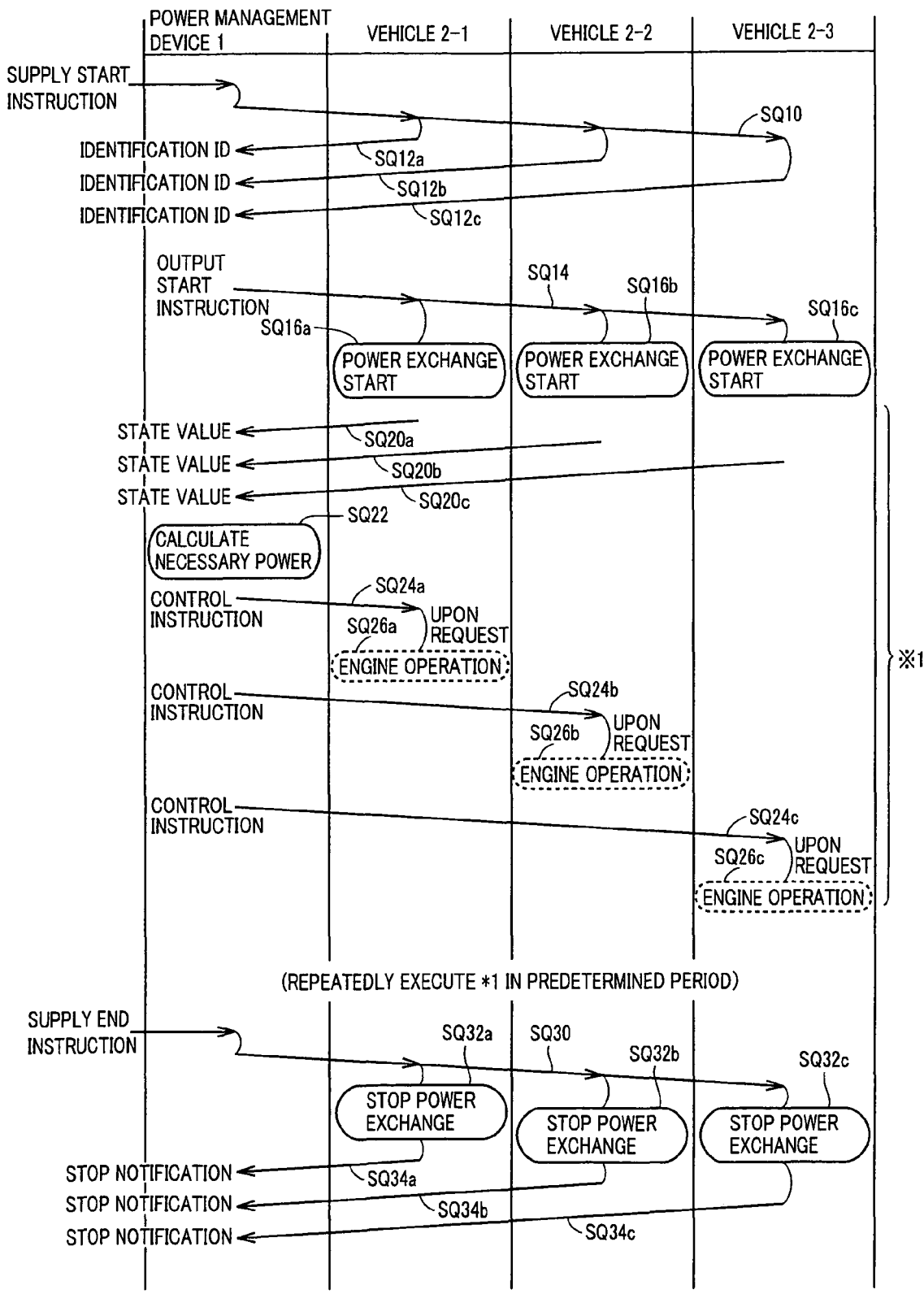
FIG. 5 shows an overall sequence of the power system in accordance with the embodiment of the present invention.

Referring to FIG. 5, the sequence of overall power system in accordance with the embodiment of the present invention will be described.

Receiving a supply start instruction from a user or the like, power management device 1 issues an identification ID inquiry instruction to each of the vehicles 2-1, 2-2 and 2-3 (sequence SQ10). Receiving the identification ID inquiry instruction, vehicle 2-1 transmits an identification ID of itself to power management device 1 (sequence SQ12a). Similarly, vehicles 2-2 and 2-3 transmit identification IDs of themselves to power management device 1 (sequences SQ12b and SQ12c).

Receiving identification IDs from vehicles 2-1, 2-2 and 2-3, power management device 1 obtains characteristics of respective vehicles based on the identification IDs, and applies an output start instruction to each of the vehicles 2-1, 2-2 and 2-3 (sequence SQ14).

Receiving the output start instruction, each of the vehicles 2-1, 2-2 and 2-3 starts exchange of electric power (sequences SQ16a, SQ16b, SQ16c). When each of the vehicles exchanges AC power, it is necessary to establish synchronization among vehicles. By way of example, power management device 1 applies the output start instruction earlier to one of the vehicles 2-1, 2-2 and 2-3 and after the exchange of electric power starts thereby, applies the output start instruction to remaining vehicles, to establish synchronization with the AC voltage generated by the preceding vehicle.

Further, each of the vehicles 2-1, 2-2 and 2-3 obtains SOC of electric storage unit BAT of itself and transmits it as a state value that additionally includes other necessary information, to power management device 1 (sequences SQ20a, SQ20b, SQ20c).

Based on the SOC of each of the vehicles 2-1, 2-2 and 2-3, power management device 1 calculates electric power necessary for executing charging of any electric storage unit that is in the low-charge state, among the electric storage units corresponding to the vehicles 2-1, 2-2 and 2-3 (sequence SQ22). Power management device 1 determines the power generation mechanism or mechanisms to be operated for generating the calculated electric power, such that the amount of fuel consumption of power generation mechanisms as a whole is minimized. Further, power management device 1 transmits a control instruction including a target charge/discharge power Pb* of the corresponding electric storage unit and a target generation power Pg* (power generation instruction) of the power generation mechanism to be operated, to each of the vehicles 2-1, 2-2 and 2-3 (sequences SQ24a, SQ24b, SQ24c).

Receiving the control instruction, each of the vehicles 2-1, 2-2 and 2-3 controls the charge/discharge power of electric storage unit BAT so that it matches the instructed target charge/discharge power Pb*. Further, if the received control instruction includes a power generation instruction, each of the vehicles 2-1, 2-2 and 2-3 operates engine ENG (sequences SQ26a, SQ26b, SQ26c), and controls generation power of power generation mechanism such that the generated power matches the instructed target generation power Pg*.

Thereafter, sequences SQ20a, SQ20b, SQ20c, sequence SQ22, sequences SQ24a, SQ24b, SQ24c and sequences SQ26a, SQ26b and SQ26c are repeated.

Receiving a supply end instruction from a user or the like, power management device 1 applies an output end instruction to each of the vehicles 2-1, 2-2 and 2-3 (sequence SQ30). Receiving the output end instruction, each of the vehicles 2-1, 2-2 and 2-3 stops exchange of electric power (sequences SQ32a, SQ32b, SQ32c). Thereafter, each of the vehicles 2-1, 2-2 and 2-3 notifies power management device 1 of the stop of power exchange (sequences SQ34a, SQ34b, SQ34c). In this manner, a series of operations is completed.

(Control Structure of Control Unit CPU)

Figure 6:
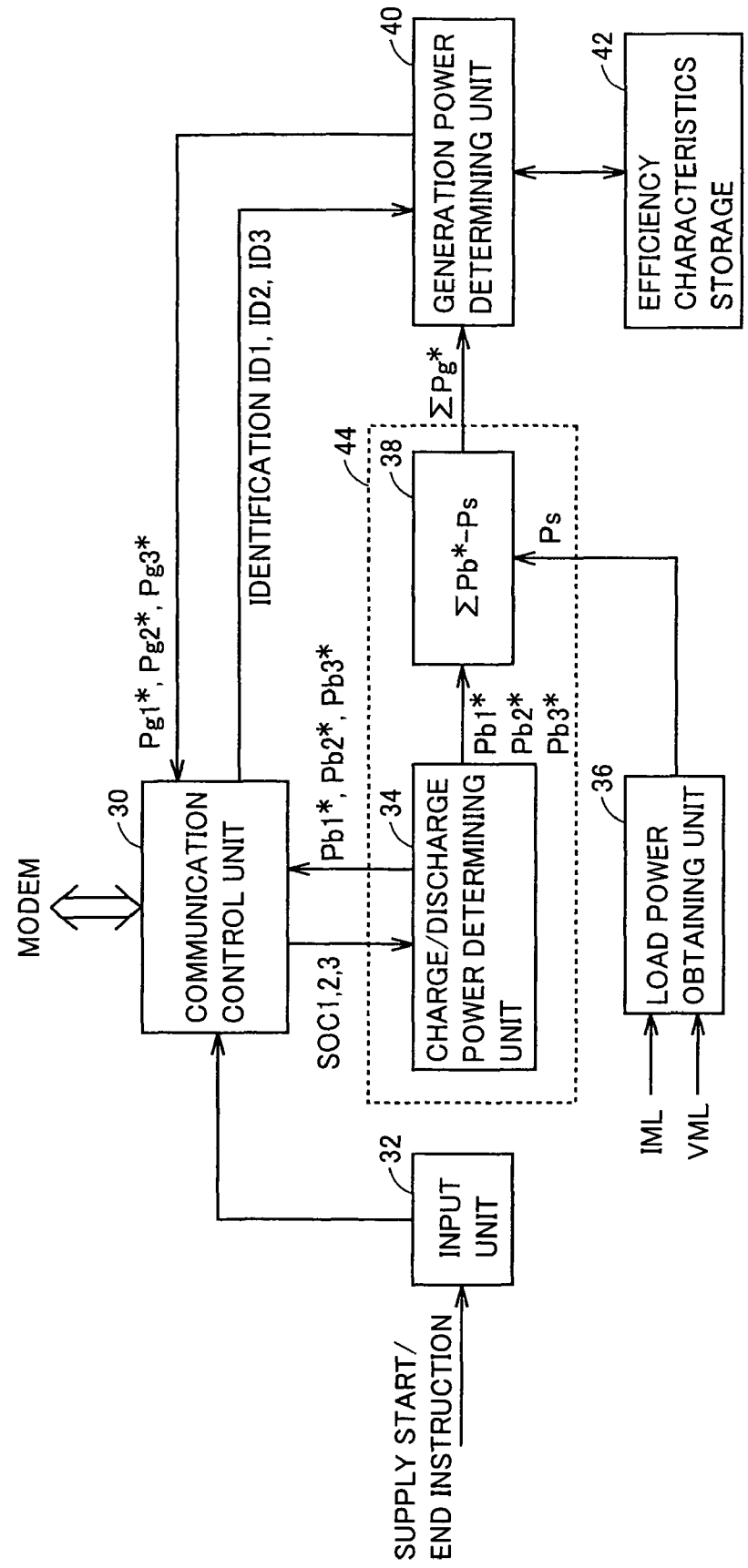
FIG. 6 is a block diagram representing a control structure in a control unit in accordance with the embodiment of the present invention.

Referring to FIG. 6, the control structure of control unit CPU includes a communication control unit 30, an input unit 32, a load power obtaining unit 36, a necessary power calculating unit 44, a generation power determining unit 40, and an efficiency characteristics storage unit 42. Further, necessary power calculating unit 44 includes a charge/discharge power determining unit 34 and a total generation power calculating unit 38.

Communication control unit 30 is an interface with modem 52 (FIG. 2), and processes information transmitted/received to/from each of the vehicles. Specifically, receiving the supply start instruction from input unit 32, communication control unit 30 transmits the identification ID inquiry instruction to each vehicle via modem 52. Thereafter, communication control unit 30 transmits the output start instruction to each vehicle via modem 52.

Further, communication control unit 30 applies SOC of each vehicle received via modem 52 to charge/discharge power determining unit 34, and applies identification ID of each vehicle received via modem 52 to generation power determining unit 40. Further, communication control unit 30 transmits target charge/discharge powers Pb1*, Pb2* and Pb3* applied from charge/discharge power determining unit 34 to corresponding vehicles and transmits target generation powers Pg1*, Pg2* and Pg3* applied from generation power determining unit 40 to corresponding vehicles. Further, receiving a supply end instruction from input unit 32, communication control unit 30 transmits an output end instruction to each vehicle, via modem 52.

Input unit 32 periodically monitors whether there is an input of supply start/end instruction, and if there is an input of either instruction, applies the input to communication control unit 30.

Based on SOC1, SOC2 and SOC3 received from vehicles 2-1, 2-2 and 2-3, respectively, if there is any electric storage unit that is in the low-charge state, necessary power calculating unit 44 calculates electric power necessary for charging the electric storage unit that is in the low-charge state.

Specifically, charge/discharge power generating unit 34 determines target charge/discharge powers Pb1*, Pb2* and Pb3* of respective vehicles, based on SOC1, SOC2 and SOC3 received from vehicles 2-1, 2-2 and 2-3. As described above, each of the target charge/discharge powers Pb1*, Pb2* and Pb3* represents a charge power (positive value) or a discharge power (negative value), dependent on the appended sign (positive or negative). Specifically, if the corresponding SOC does not represent the low-charge state, charge/discharge power determining unit 34 determines the target charge/discharge power Pb* to a prescribed positive value, and if the corresponding SOC represents the low-charge state, it determines the target charge/discharge power Pb* to a prescribed negative value. Then, charge/discharge power determining unit 34 applies the determined target charge/discharge powers Pb1*, Pb2* and Pb3* to communication control unit 30 and total generation power calculating unit 38.

Total generation power calculating unit 38 subtracts the load power Ps applied from load power obtaining unit 36 from the sum of target charge/discharge powers Pb1*, Pb2* and Pb3*. Specifically, total generation power calculating unit 38 calculates the power ΣPg* necessary for charging the electric storage unit BAT that is in the low-charge state, taking into account the load power supplied to power load LOAD. Then, total generation power calculating unit 38 applies the calculated power ΣPg* to generation power determining unit 40.

Making reference to efficiency characteristics storage unit 42, generation power determining unit 40 specifies efficiency characteristic obtained in advance, which indicates correspondence between generation power of the power generation mechanism and the fuel consumption efficiency of the engine in each vehicle, in accordance with identification ID1, identification ID2 and identification ID3 received from vehicles 2-1, 2-2 and 2-3, respectively. Generation power determining unit 40 determines target generation powers Pg1*, Pg2* and Pg3* for sharing the power ΣPg* such that the fuel consumption efficiency of operated power generation mechanisms as a whole is minimized, based on the efficiency characteristic of each vehicle. For the power generation mechanism that need not generate power, generation power determining unit 40 sets the corresponding target generation power to zero. Then, generation power determining unit 40 applies the determined target generation powers Pg1*, Pg2* and Pg3* to communication control unit 30.

Efficiency characteristics storage unit 42 stores a plurality of efficiency characteristics corresponding to the identification IDs. Receiving an identification ID from generation power determining unit 40, efficiency characteristics storage unit 42 extracts the efficiency characteristic that corresponds to the identification ID from the stored plurality of efficiency characteristics, and applies it to generation power determining unit 40. By way of example, efficiency characteristics storage unit 42 stores the efficiency characteristics in the form of a map.

Figure 7:
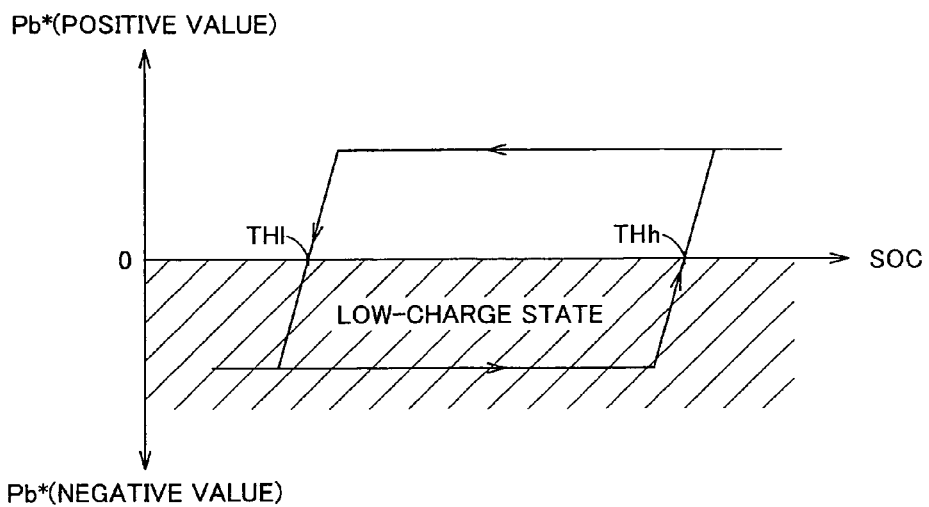
FIG. 7 illustrates contents of a process at a charge/discharge power determining unit.

For instance, charge/discharge power determining unit 34 stores the charge/discharge amount characteristic such as shown in FIG. 7. The charge/discharge amount characteristic represents correspondence between the SOC of electric storage unit BAT and the determined target charge/discharge power Pb*. Particularly, in the embodiment of the present invention, a charge/discharge amount characteristic that has history characteristic (hysteresis characteristic) is defined. Specifically, if the SOC of electric storage unit BAT becomes lower than a lower threshold value Thl, the electric storage unit BAT is determined to be in the low-charge state, and the determination of low-charge state is maintained until the SOC increases to an upper threshold value Thh.

Therefore, while the determination of low-charge state is maintained, the charge/discharge power of the corresponding electric storage unit BAT is set to a prescribed negative value (charge power). If it is not determined to be the low-charge state, that is, when SOC of the electric storage unit BAT is sufficiently large, the target charge/discharge power Pb* of the corresponding electric storage unit BAT is set to a prescribed positive value (discharge power). Actual target charge/discharge power of each electric storage unit BAT changes dependent on fluctuation of load power Ps of power load LOAD and the like. Therefore, the target charge/discharge power Pb* of each electric storage BAT may be determined as needed at each time point, within the range of target charge/discharge power defined by the charge/discharge amount characteristic as shown in FIG. 7.

Figure 8:
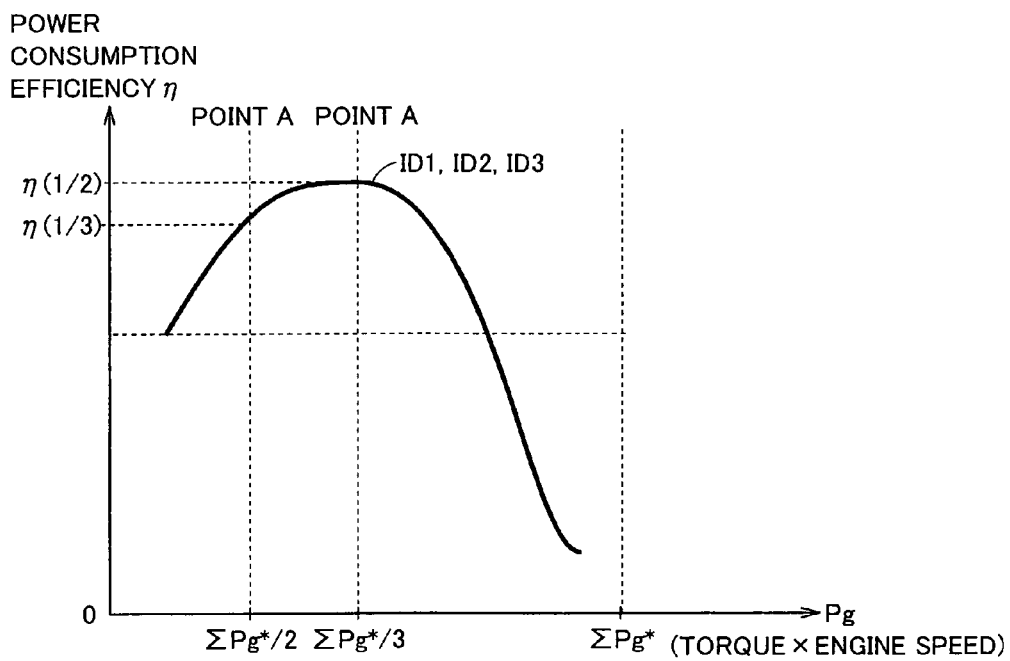
FIG. 8 illustrates contents of a process at a generation power determining unit.

Referring to FIG. 8, contents of process at generation power determining unit 40 will be described. By way of example, generation power determining unit 40 determines such efficiency characteristic as shown in FIG. 8, based on the identification ID of each vehicle. The efficiency characteristic defines correspondence between the generation power Pg and fuel consumption efficiency of engine ENG in each power generation mechanism.

Based on the efficiency characteristic, generation power determining unit 40 determines a power generation mechanism or mechanisms to be operated, such that the amount of fuel consumption by the power generation mechanism or mechanisms as a whole is minimized. By way of example, if vehicles 2-1, 2-2 and 2-3 are all of the same vehicle line, efficiency characteristics of respective power generation mechanisms are mutually the same. Therefore, generation power determining unit 40 determines the number of power generation mechanisms to be operated, so that fuel consumption efficiency of the operated power generation mechanism or mechanisms as a whole is maximized.

Specifically, the power ΣPg* necessary for charging the electric storage unit BAT that is in the low-charge state is divided by the number of power generation mechanisms (for example, 2 or 3), and in each case, the fuel consumption efficiency corresponding to the generation power Pg shared by each power generation mechanism is calculated. If two power generation mechanisms are to be operated, each power generation mechanism bears ΣPg*/2 and, therefore, fuel consumption efficiency η(½) is obtained. If three power generation mechanisms are to be operated, each power generation mechanism bears ΣPg*/3 and, therefore, fuel consumption efficiency η(⅓) is obtained. According to the efficiency characteristic shown in FIG. 8, η(½)>η(⅓) and, therefore, in order to minimize the amount of fuel consumption by the power generation mechanisms as a whole, two power generation mechanisms should be operated. Therefore, generation power determining unit 40 determines that two power generation mechanisms should be operated and transmits power generation instruction to any two of the vehicles.

As described above, generation power determining unit 40 determines the number of power generation mechanisms to be operated, so that the fuel consumption efficiency of the operated power generation mechanisms as a whole is maximized.

Figure 9:
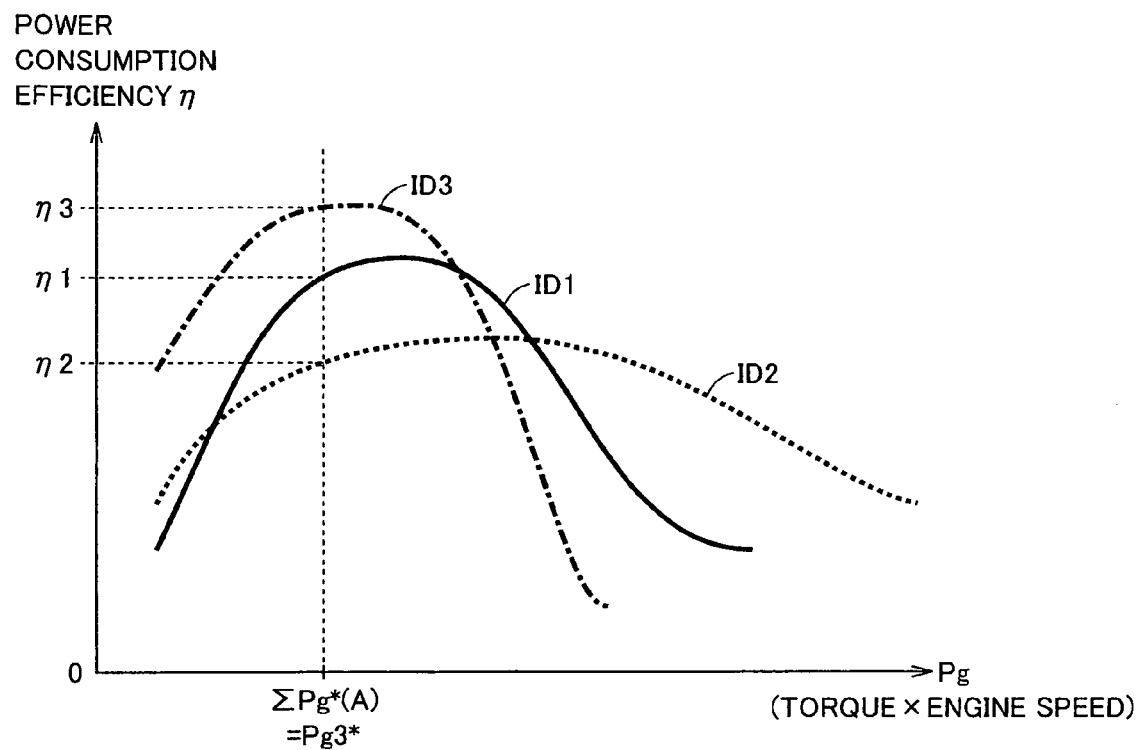
FIG. 9 illustrates contents of another process at the generation power determining unit.

Referring to FIG. 9, contents of another process at generation power determining unit 40 will be described. If vehicles 2-1, 2-2 and 2-3 are of different vehicle lines, respective power generation mechanisms have mutually different efficiency characteristics. For instance, if the power $\Sigma Pg^*$ necessary for charging electric storage unit BAT that is in the low-charge state is smaller than the maximum power generated by each power generation mechanism, it follows that the power generation mechanism having the highest fuel consumption efficiency when generating the power $\Sigma Pg^*$ should be selected. Specifically, as regards the efficiency characteristics shown in FIG. 9, among the fuel consumption efficiencies $\eta 1$, $\eta 2$ and $\eta 3$ of respective power generation mechanisms corresponding to the power $\Sigma Pg^*$, there is a relation of $\eta 3 > \eta 1 > \eta 2$. Therefore, it can be seen that, in order to maximize total fuel consumption efficiency, the power generation mechanism for vehicle 2-3 should be operated. Accordingly, generation power determining unit 40 determines that power generation mechanism of vehicle 2-3 should be operated, and transmits target generation power $Pg3^*$ ($=\Sigma Pg^*$) to vehicle 2-3.

The target generation power $Pg^*$ of each vehicle may be determined by various methods other than the processes shown in FIGS. 8 and 9. By way of example, the target generation power $Pg^*$ of each vehicle may be determined by numerical calculation so that fuel consumption efficiency related to power generation is maximized, by applying Linear Programming method (LP method), with the characteristic efficiency of each vehicle used as object function.

(Control Structure of Control Unit ECU)

Figure 10:
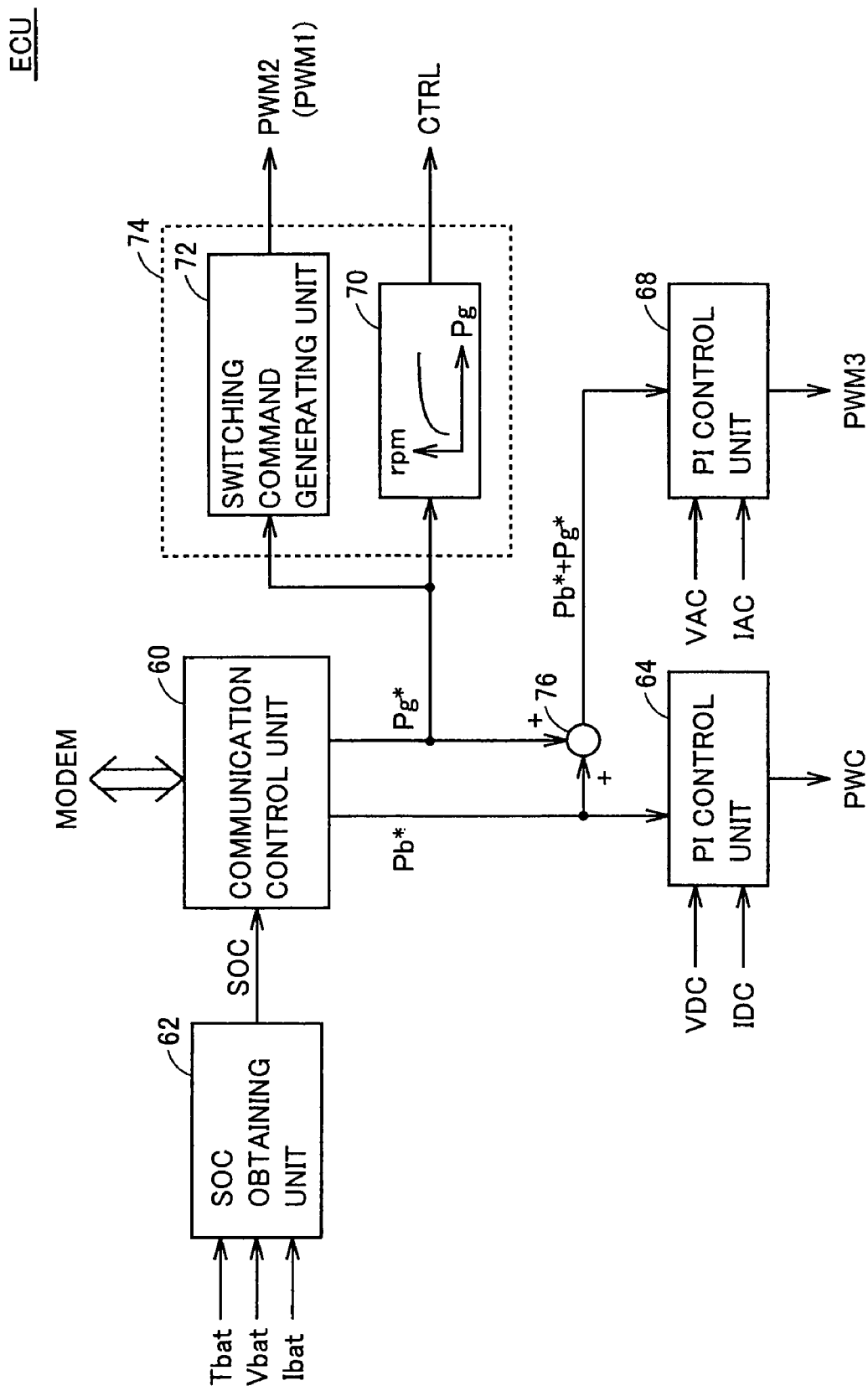
FIG. 10 is a block diagram representing a control structure in a control unit in accordance with the embodiment of the present invention.

Referring to FIG. 10, the control structure of control unit ECU in accordance with the embodiment of the present invention includes a communication control unit 60, an SOC obtaining unit 62, PI control units 64, 68, an adding unit 76, and a power generation control unit 74. Further, power generation control unit 74 includes a switching command generating unit 72 and an engine control unit 70.

Communication control unit 60 is an interface with modem 22 (FIG. 3), and it processes information transmitted/received to/from power management device 1. Specifically, receiving identification ID inquiry instruction via modem 22, it transmits the identification ID representing itself to power management device 1. Thereafter, receiving the target charge/discharge power $Pb^*$ via modem 22, communication control unit 60 applies it to PI control unit 64 and adding unit 76, and receiving target generation power $Pg^*$, applies it to switching command generating unit 72 and engine control unit 70. Further, communication control unit 60 transmits SOC applied from SOC obtaining unit 62 to power management device 1.

SOC obtaining unit 62 obtains SOC of electric storage unit BAT based on battery temperature Tbat, output voltage Vbat and charge/discharge current Ibat, and applies it to communication control unit 60. As to the configuration of SOC obtaining unit 62 for obtaining SOC of electric storage unit BAT, known technique may be used. As an example, the state of charge can be detected successively by adding tentative SOC calculated from the relation between output voltage Vbat appeared when the electric storage unit BAT is in an open-circuit state (open circuit voltage value) and the battery temperature Tbat, to a correction SOC calculated from an integrated value of charge/discharge current Ibat.

PI control unit 64 generates a switching command PWC for controlling converter CONV such that the charge/discharge power of corresponding electric storage unit BAT matches the target charge/discharge power $Pb^*$ applied from communication control unit 60. Specifically, PI control unit 64 calculates actual value of charge/discharge power of electric storage unit BAT from the product of main line current IDC and main line voltage VDC, and in accordance with the deviation between the calculated actual value of charge/discharge power and the target charge/discharge value $Pb^*$, generates the switching command PWC. PI control unit 64 is formed to include at least a proportional element (P) and an integral element (I).

Power generation control unit 74 generates a switching command PWM2 for controlling inverter INV2 and a control signal CTRL for controlling engine ENG, so that the power generated by the corresponding power generation mechanism matches the target generation power $Pg^*$ applied from communication control unit 60.

Specifically, engine control unit 70 stores predetermined operation point characteristic representing correspondence between driving force (generation power Pg) generated by engine ENG and the rotational speed of engine ENG. Based on the operation point characteristic, engine control unit 70 determines the rotational speed (operation point) of engine ENG that corresponds to the target generation power $Pg^*$ applied from communication control unit 60, and generates the control signal CNRL. Further, switching command generating unit 72 generates the switching command PWM2 for controlling inverter INV2 such that motor generator MG2 that rotates receiving the driving force of engine ENG can generate the electric power matching the target generation power $Pg^*$.

Adding unit 76 adds target charge/discharge power $Pb^*$ applied from communication control unit 60 to target generation power $Pg^*$, to generate target power to be exchanged by the vehicle(s), and applies it to PI control unit 68.

PI control unit 68 generates switching command PWM3 for controlling inverter INV3, for controlling electric power to be exchanged to/from the outside of the vehicle. Specifically, PI control unit 68 calculates the electric power (actual value) transferred to/from the outside of the vehicle from the product of supply current IAC and supply voltage VAC, and in accordance with the deviation between the calculated exchange power and the target power to be exchanged (target charge/discharge power $Pb^*$+target generation power $Pg^*$), generates switching command PWM3. PI control unit 68 is formed to include at least a proportional element and an integral element.

(Flow Chart)

Figure 11:
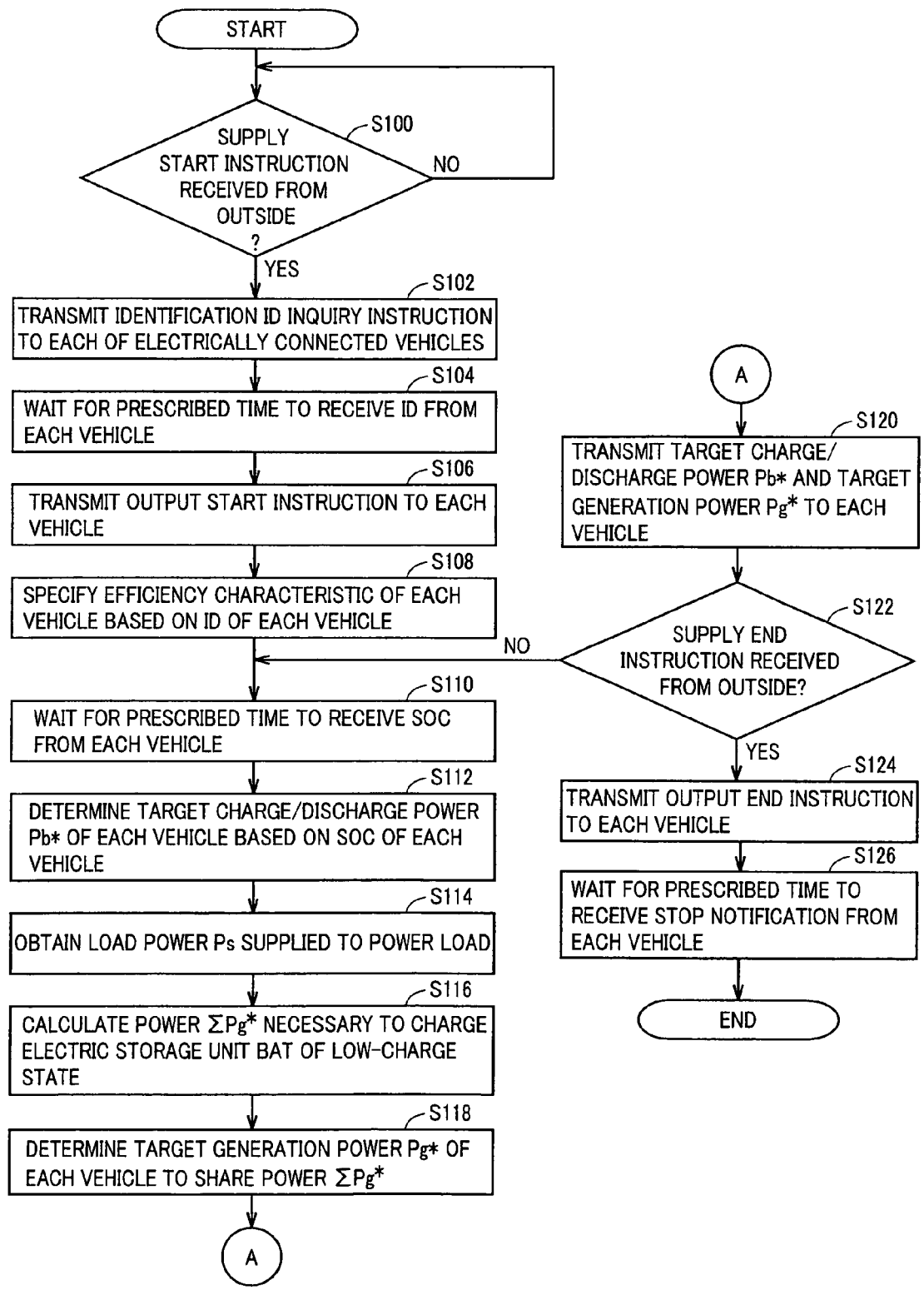
FIG. 11 is a flowchart showing process procedure in the power management device in accordance with an embodiment of the present invention.

Referring to FIG. 11, process procedure in power management device 1 in accordance with the embodiment of the present invention will be described.

Control unit CPU determines whether a supply start instruction has been received from the outside or not (step S100). If the supply start instruction has not been received (NO at step S100), control unit CPU waits for the supply start instruction (step S100).

If a supply start instruction has been received (YES at step S100), control unit CPU transmits an identification ID inquiry instruction to each of the vehicles electrically connected to each other (step S102). Then, control unit CPU waits for a prescribed time period to receive the identification ID from each vehicle (step S104). Receiving the identification ID from each vehicle, control unit CPU transmits an output start instruction to each of the vehicles (step S106). Then, control unit CPU specifies efficiency characteristic of each vehicle, based on the identification ID of each vehicle.

Thereafter, control unit CPU waits for a prescribed time period to receive SOC from each vehicle (step S110). Receiving SOC from each vehicle, control unit CPU determines the target charge/discharge power Pb* of each vehicle, based on the SOC of each vehicle (step S112). Further, control unit CPU obtains load power Ps supplied to power load LOAD (step S114). Then, control unit CPU calculates, from the difference between the sum of the determined target charge/discharge power Pb* of each vehicle and the load power Ps, the power ΣPg* necessary for charging the electric storage unit BAT that is in the low-charge state (step S116). Then, control unit CPU determines the target generation power Pg* of each vehicle, to share the power ΣPg*, such that the fuel consumption efficiency of the power generation mechanism or mechanisms to be operated as a whole is maximized (step S118).

Then, control unit CPU transmits the target charge/discharge power Pb* of each vehicle determined at step S112 and target generation power Pg* of each vehicle determined at step S118, to corresponding vehicles (step S120).

Thereafter, control unit CPU determines whether a supply end instruction has been received from the outside or not (step S122). If the supply end instruction has not been received (NO at step S122), control unit CPU repeatedly executes steps 110 to S122 described above.

If the supply end instruction is received (YES at step S122), control unit CPU transmits an output end instruction to every vehicle (step S124). Then, control unit CPU waits for a prescribed time period to receive a stop notification from each vehicle (step S126). When the stop notifications from all vehicles are received, control unit CPU ends the process.

Figure 12:
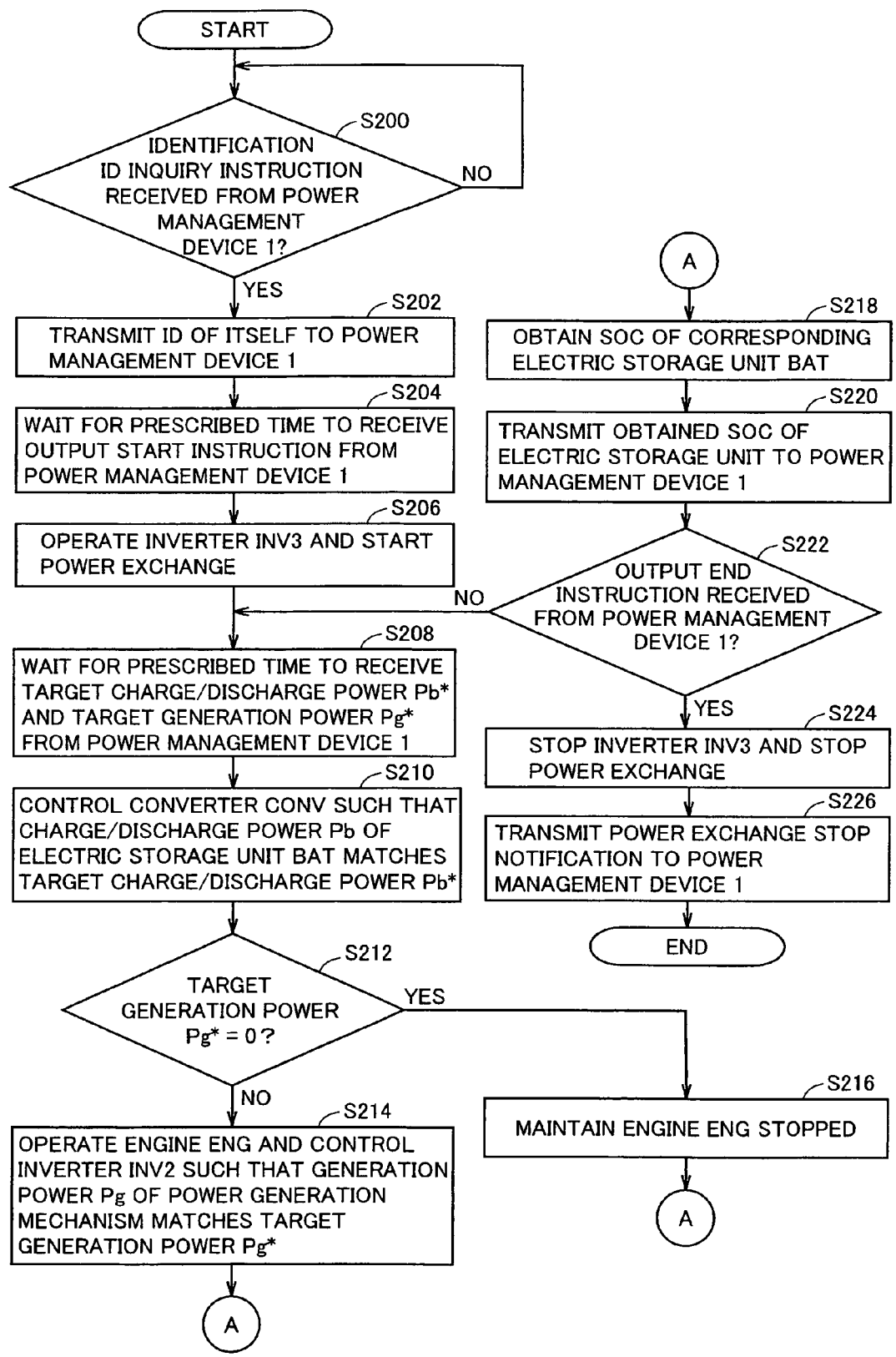
FIG. 12 is a flowchart showing process procedure in each of the vehicles in accordance with the embodiment of the present invention.

Next, process procedure in each of the vehicles 2-1, 2-2 and 2-3 in accordance with the embodiment of the present invention will be described with reference to FIG. 12.

Control unit ECU determines whether an identification ID inquiry instruction has been received from power management device 1 or not (step S200). If the identification ID inquiry instruction has not been received (NO at step S200), control unit ECU waits for the identification ID inquiry instruction (step S200).

If the identification ID inquiry instruction has been received (YES at step S200), control unit ECU transmits the identification ID representing itself to power management device 1 (step S202). Then, control unit ECU waits for a prescribed time period to receive an output start instruction from power management device 1 (step S204). Receiving the output start instruction from power management device 1, control unit ECU operates inverter INV3, and starts exchange of electric power (step S206).

Thereafter, control unit ECU waits for a prescribed time period to receive the target charge/discharge power Pb* and target generation power Pg* from power management device 1 (step S208). Receiving the target charge/discharge power Pb*, control unit ECU controls converter CONV such that the charge/discharge power Pb of electric storage unit BAT matches the target charge/discharge power Pb* (step S210).

Receiving the target generation power Pg*, control unit ECU determines whether the target generation power Pg* is zero or not (step S212). If the target generation power Pg* is not zero (NO at step S212), control unit ECU operates engine ENG and controls inverter INV2 such that the generated power Pg of power generation mechanism matches the target generation power Pg* (step S214).

If the target generation power Pg* is zero (YES at step S212), control unit ECU maintains engine ENG in the stopped state (step S216).

Thereafter, control unit ECU obtains SOC of the corresponding electric storage unit BAT (step S218). Then, control unit ECU transmits the obtained SOC of electric storage unit BAT to power management device 1 (step S220).

Further, control unit ECU determines whether an output end instruction has been received from power management device 1 or not (step S222). If the output end instruction has not been received (NO at step S222), control unit ECU repeatedly executes steps S208 to S222 described above.

If the output end instruction has been received (YES at step S222), control unit ECU stops inverter INV3 and stops power exchange (step S224). Then, control unit ECU transmits a notification that power exchange has stopped to power management device 1 (step S226), and ends the process.

According to the embodiment of the present invention, based on the SOC transmitted from each of the plurality of vehicles, power management device 1 calculates the power necessary for charging the electric storage unit BAT that is in the low-charge state. Then, the power generation mechanism or mechanisms to be operated to generate the calculated power are determined such that the amount of fuel consumption by the power generation mechanism or mechanisms as a whole is minimized. Accordingly, it becomes possible to optimally select the power generation mechanism or mechanisms to be operated in the power system as a whole, in accordance with the state of electric storage unit BAT. Therefore, efficient use of fuel for power generation and management of state of charge of the electric storage unit can both be realized, and thus, a power system that can efficiently manage the state of charge of electric storage unit in each vehicle can be provided.

[Modification]

As the power system in accordance with the embodiment of the present invention, a configuration has been described in which electric power is supplied to power load LOAD by using an inverter INV3 provided separate from inverters INV1 and INV2 for driving motor generators MG1 and MG2 in each vehicle. In a modification of the present invention, a configuration will be described in which inverter INV3 is not provided and driving of motor generators MG1 and MG2 as well as power supply to power load LOAD are both attained by using inverters INV1 and INV2.

Figure 13:
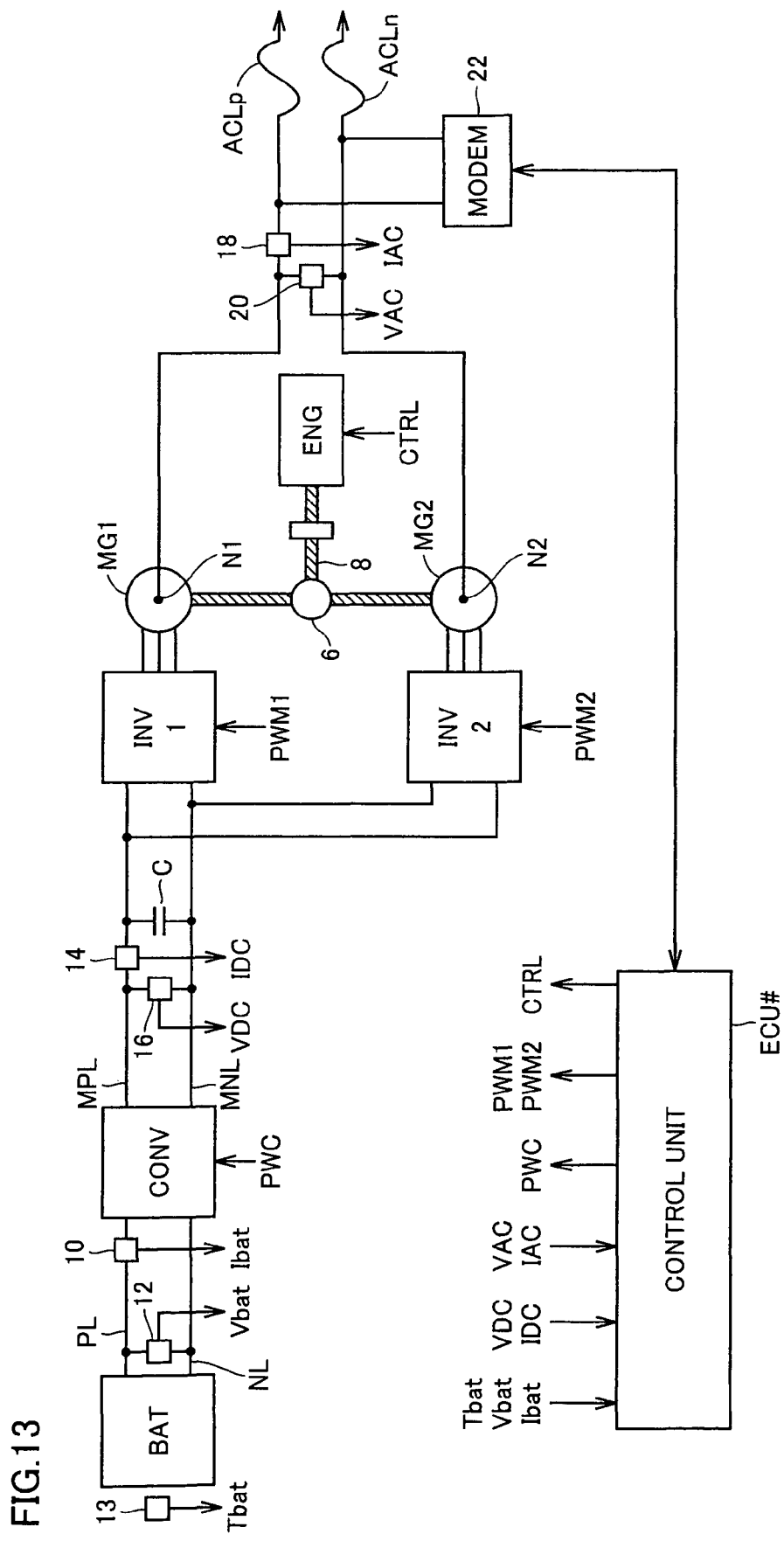
FIG. 13 shows a schematic configuration of the vehicle in accordance with a modification of the embodiment of the present invention.

Referring to FIG. 13, the vehicle in accordance with the modification of the present embodiment corresponds to the configuration of FIG. 3, in which inverter INV3 is removed, and connection of positive supply line ACLp and negative supply line ACLn is changed to a neutral point N1 of motor generator MG1 and neutral point N2 of motor generator MG2, respectively.

As described above, motor generators MG1 and MG2 are three-phase AC rotating machines having rotors in which permanent magnets are embedded. Further, in the modification of the embodiment of the present invention, motor generators MG1 and MG2 include stators with Y-connected (star-connected) three-phase coils. In the Y-connection, the node at which coils are connected to each other corresponds to the neutral point N1 or N2 of motor generators MG1 or MG2.

As described above, inverters INV1 and INV2 are formed of bridge circuits including switching elements of three phases. Specifically, inverters INV1 and INV2 each include three switching elements on the upper arm side (positive side) and three switching elements on the lower arm side (negative side). When three-phase AC power is to be generated from inverter INV1 or INV2, one of the switching elements on the upper arm side and one of the switching elements on the lower arm side are switched with time and driven to the on-state.

It is also possible to collectively turn on/off the three switching elements on each of the upper and lower arm sides. In such an operation mode, three switching elements on the upper arm side can be regarded as in the same switching state (all on or all off), and three switching elements on the lower arm side can be regarded as in the same switching state.

In such an operation mode, respective phase voltages come to be equal to each other and, therefore, a zero voltage vector with the neutral point being the reference can be defined.

Figure 14:
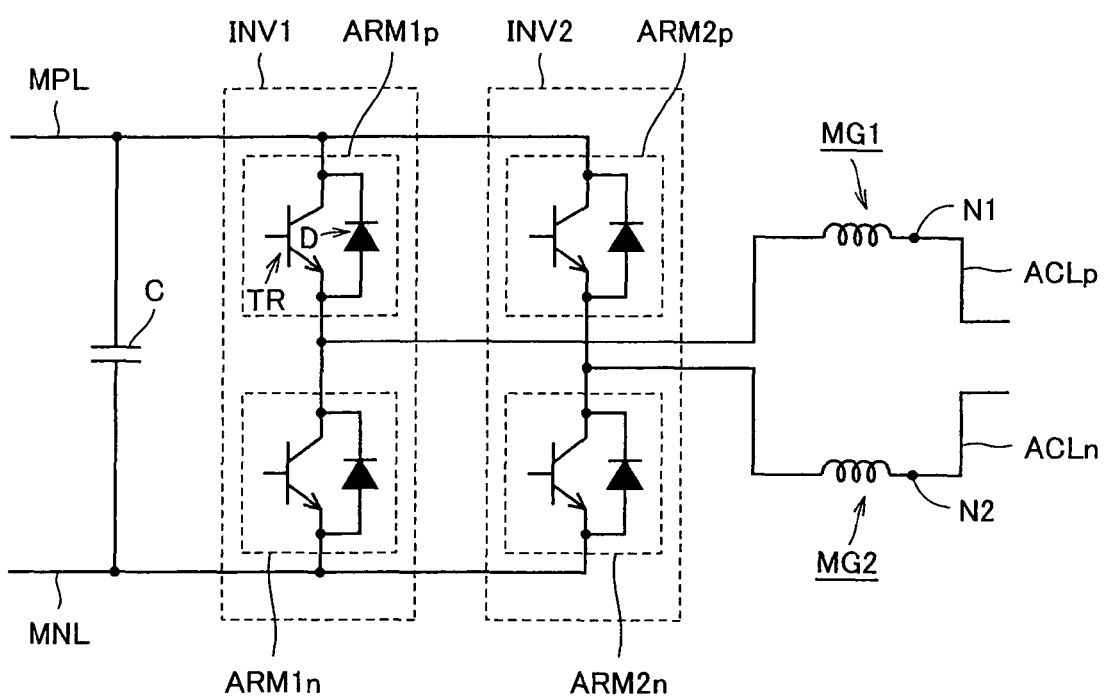
FIG. 14 represents a zero-phase equivalent circuit of the inverter and the motor generator when a zero-voltage vector is to be generated.

FIG. 14 is a zero-phase equivalent circuit of inverters INV1 and INV2 and motor generators MG1 and MG2, when the zero voltage vector is generated.

Referring to FIG. 14, when inverters INV1 and INV2 executes an operation mode that generates the zero-voltage vector as described above, the three switching elements TR on the upper arm side of inverter INV1 will be collectively represented as upper arm ARM1$p$, and the three switching elements TR on the lower arm side of inverter INV1 will be collectively represented as lower arm ARM1$n$. Similarly, the three switching elements on the upper arm side of inverter INV2 will be collectively represented as upper arm ARM2$p$, and the three switching elements on the lower arm side of inverter INV2 will be collectively represented as lower arm ARM2$n$.

The zero-phase equivalent circuit shown in FIG. 14 may be regarded as a single-phase inverter that converts the DC power supplied through main positive power line MPL and main negative power line MNL to a single-phase AC power and outputs the converted single-phase AC power from neutral points N1 and N2 through positive supply line ACLp and negative supply line ACLn.

Therefore, by changing with time the zero voltage vector in each of the inverters INV1 and INV2 and controlling switching of inverters INV1 and INV2 such that each of the inverters operate as a single-phase inverter, it becomes possible to generate AC power from the discharge power from electric storage unit BAT and to supply the power to power load LOAD.

Except for these points, the configuration is the same as that of the vehicle shown in FIG. 3 and, therefore, detailed description will not be repeated.

Power system sequence and process flows in accordance with the modification of the embodiment are also the same as those of the embodiment of the present invention described above and, therefore, detailed description will not be repeated.

According to the modification of the embodiment, in addition to the effects attained by the embodiment of the present invention, configuration of each vehicle can be simplified. Therefore, the power system in accordance with the present invention can be implemented at a lower cost.

In the embodiment and in the modification thereof, a configuration has been described in which a power management device is arranged separate from each vehicle. The function of power management device may be incorporated in any of the vehicles.

Further, in the embodiment and in the modification thereof, a power system consisting solely of hybrid vehicles has been illustrated. A configuration may be possible in which vehicles of different types such as hybrid vehicles and fuel cell vehicles are included in a common power system.

Further, in the embodiment and in the modification thereof, a configuration has been described in which communication between vehicles or between a vehicle and the supply management device is implemented by PLC communication using supply lines. The method of communication is not restricted. By way of example, radio communication such as portable telephone, PHS, wireless LAN and Bluetooth (registered trademark) may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power system, comprising:
   a plurality of vehicles each adapted to allow transfer of power to/from the outside of the vehicle;
   a power line for electrically connecting said plurality of vehicles to each other; and
   power management means for managing power exchange among said plurality of vehicles; wherein
   said power management means is adapted to allow transmission/reception of information to/from each of said plurality of vehicle;
   each of said plurality of vehicles includes;
   a rechargeable electric storage unit,
   a power generation mechanism capable of generating power by receiving driving force from an engine operated by fuel combustion,
   state of charge obtaining means for obtaining state of charge of said electric storage unit,
   state of charge transmitting means for transmitting the obtained state of charge to said power management means, and
   power generation control means for controlling power generation by said power generation mechanism, in response to a power generation instruction from said power management means;
   said power management means includes;
   necessary power calculating means for calculating, if there is any electric storage unit that is in a low-charge state, based on said state of charge transmitted from each of said plurality of vehicles, power necessary for charging the electric storage unit that is in the low-charge state,
   generation power determining means for determining at least one power generation mechanism to be operated for generating the power calculated by said necessary power calculating means, such that amount of fuel consumption by the power generation mechanism as a whole is minimized, and
   power generation instruction transmitting means for applying said power generation instruction to the vehicle that corresponds to each of the determined power generation mechanisms.

2. The power system according to claim 1, wherein
   said generation power determining means determines number of said power generation mechanisms to be operated, based on efficiency characteristic obtained in advance, representing correspondence between generation power of each of said power generation mechanisms and fuel consumption efficiency of said engine, such that fuel consumption efficiency of power generation mechanism or mechanisms to be operated as a whole is maximized.

3. The power system according to claim 1, wherein
   said generation power determining means determines generation power to be shared by each of said power generation mechanisms to be operated, based on efficiency characteristic obtained in advance, representing correspondence between generation power of each of said power generation mechanisms and fuel consumption efficiency of said engine, such that fuel consumption efficiency of power generation mechanism or mechanisms to be operated as a whole is maximized.

4. The power system according to claim 2, wherein
each of said plurality of vehicles further includes identification information transmitting means for transmitting identification information representing itself to said power management means;
said identification information transmitting means further includes efficiency characteristics storing means for storing in advance said efficiency characteristic in correspondence with each piece of said identification information; and
said generation power determining means specifies said efficiency characteristic of each of said plurality of vehicles among a plurality of said stored efficiency characteristics, based on said identification information transmitted from each of said plurality of vehicles.

5. The power system according to claim 2, wherein
said power line is electrically connected, in order to allow power exchange between said plurality of vehicles and a common power load, to said power load;
said power management means further includes load power obtaining means for obtaining load power to be supplied to said power load; and
said necessary power calculating means calculates said necessary power by reflecting the load power obtained by said load power obtaining means.

6. The power system according to claim 1, wherein
said power management means and each of said plurality of vehicles are adapted to transmit/receive information through said power line.

7. The power system according to claim 1, wherein
at least one of said plurality of vehicles includes;
first and second rotating electrical machines each formed to include a star-connected stator, and
first and second inverters electrically connected to said electric storage unit for driving said first and second rotating electrical machines, respectively, and
the at least one vehicle is adapted to perform power exchange to/from the outside of said vehicle, through a first neutral point of said first rotating electrical machine and a second neutral point of said second rotating electrical machine, and
each of said first and second inverters is capable of executing a switching operation such that a single-phase AC voltage is generated between said first neutral point and said second neutral point.

8. A power system, comprising:
a plurality of vehicles each adapted to allow transfer of power to/from the outside of the vehicle;
a power line for electrically connecting said plurality of vehicles to each other; and
a power management device for managing power exchange among said plurality of vehicles; wherein
said power management device is adapted to allow transmission/reception of information to/from each of said plurality of vehicles;
each of said plurality of vehicles includes;
a rechargeable electric storage unit,
a power generation mechanism capable of generating power by receiving driving force from an engine operated by fuel combustion,
a state of charge obtaining unit for obtaining state of charge of said electric storage unit,
a state of charge transmitting unit for transmitting the obtained state of charge to said power management device, and
a power generation control unit for controlling power generation by said power generation mechanism, in response to a power generation instruction from said power management device;
said power management device is operative to;
calculate, if there is any electric storage unit that is in a low-charge state, based on said state of charge transmitted from each of said plurality of vehicles, power necessary for charging the electric storage unit that is in the low-charge state,
determine at least one power generation mechanism to be operated for generating the calculated necessary power, such that amount of fuel consumption by the power generation mechanism as a whole is minimized, and
apply said power generation instruction to the vehicle that corresponds to each of the determined power generation mechanisms.

9. For a plurality of vehicles each including a rechargeable electric storage unit, a method of managing state of charge of said electric storage unit; wherein
each of said plurality of vehicles is adapted to allow transfer of power to/from the outside of the vehicle, electrically connected to each other through a power line, and adapted to allow transmission/reception of information to/from a power management unit, and
each of said plurality of vehicles includes a power generation mechanism capable of generating power, by receiving driving force from an engine operated by fuel combustion;
said method comprising the steps of:
for each of said plurality of vehicles, obtaining state of charge of corresponding said electric storage unit;
transmitting the obtained state of charge from each of said plurality of vehicles to said power management unit;
calculating, if there is any electric storage unit that is in a low-charge state, based on the state of charge transmitted from each of said plurality of vehicles to said power management unit, power necessary for charging the electric storage unit that is in the low-charge state;
determining, by said power management unit, at least one power generation mechanism to be operated for generating the necessary power, such that total amount of fuel consumption is minimized;
applying a power generation instruction from said power management unit, to the vehicle corresponding to each of the determined power generation mechanisms; and
controlling power generation by corresponding the power generation mechanism, in response to said power generation instruction, in the vehicle receiving said power generation instruction.

10. The method of managing state of charge according to claim 9, wherein
in said step of determining power generation mechanism, the number of said power generation mechanisms to be operated is determined, based on efficiency characteristic obtained in advance, representing correspondence between generation power of each of said power generation mechanisms and fuel consumption efficiency of said engine, such that fuel consumption efficiency of power generation mechanism or mechanisms to be operated as a whole is maximized.

11. The method of managing state of charge according to claim 9, wherein in said step of determining power generation mechanism, generation power to be shared by each of said power generation mechanisms to be operated is determined, based on efficiency characteristic obtained in advance, representing correspondence between generation power of each of said power generation mechanisms and fuel consumption efficiency of said engine, such that fuel consumption efficiency of power generation mechanism or mechanisms to be operated as a whole is maximized.

12. The method of managing state of charge according to claim 10, further comprising the steps of:

each of said plurality of vehicles transmitting identification information representing itself to said power management unit; and based on said identification information transmitted from each of said plurality of vehicles, said power management unit specifying said efficiency characteristic of each of said plurality of vehicles, making reference to a plurality of said efficiency characteristics stored in advance in correspondence with said identification information.

13. The power system according to claim 3, wherein each of said plurality of vehicles further includes identification information transmitting means for transmitting identification information representing itself to said power management means;

said identification information transmitting means further includes efficiency characteristics storing means for storing in advance said efficiency characteristic in correspondence with each piece of said identification information; and said generation power determining means specifies said efficiency characteristic of each of said plurality of vehicles among a plurality of said stored efficiency characteristics, based on said identification information transmitted from each of said plurality of vehicles.

14. The method of managing state of charge according to claim 11, further comprising the steps of:

each of said plurality of vehicles transmitting identification information representing itself to said power management unit; and based on said identification information transmitted from each of said plurality of vehicles, said power management unit specifying said efficiency characteristic of each of said plurality of vehicles, making reference to a plurality of said efficiency characteristics stored in advance in correspondence with said identification information.

* * * * *